United States Patent
Bergs et al.

(10) Patent No.: US 7,454,757 B2
(45) Date of Patent: Nov. 18, 2008

(54) TECHNOLOGY FOR PROCESSING INFORMATION E.G. REPRESENTING PRINT REQUESTS IN NETWORKED ENVIRONMENT A SYSTEM SUITABLE FOR APPLYING THIS METHOD, AND A COMPUTER PROGRAM ELEMENT COMPRISING A PROGRAM CODE FOR APPLYING THIS METHOD

(75) Inventors: Roger Michel Helene Bergs, Venlo (NL); Wilhelmus Johannes Couwenberg, Boekel (NL); Marcus Willibrordus Krom, Eindhoven (NL); Olivier Romuald Charles Pierre Henri Schneider, Eindhoven (NL); Andreas Wierda, Venlo (NL)

(73) Assignee: Océ-Technologies B.V., Venlo (NL)

( * ) Notice: Subject to any disclaimer, the term of this patent is extended or adjusted under 35 U.S.C. 154(b) by 142 days.

(21) Appl. No.: 09/878,962

(22) Filed: Jun. 13, 2001

(65) Prior Publication Data
US 2002/0010731 A1    Jan. 24, 2002

(30) Foreign Application Priority Data
Jun. 13, 2000   (NL) .................................... 1015415

(51) Int. Cl.
*G06F 3/00* (2006.01)
*G06F 9/46* (2006.01)
(52) U.S. Cl. ........................................ 719/310; 718/100
(58) Field of Classification Search ................ 709/321; 719/310, 321; 718/100
See application file for complete search history.

(56) References Cited

U.S. PATENT DOCUMENTS 5,129,639 A * 7/1992 DeHority ..................... 270/1.1
5,467,434 A * 11/1995 Hower et al. ................ 358/1.15

(Continued)

FOREIGN PATENT DOCUMENTS
EP         772114 A1      7/1997

OTHER PUBLICATIONS

Sklut, Robert, Apparatus and method for programming a job ticket in a document processing system, Jul. 05, 1997.*

(Continued)

*Primary Examiner*—Meng-Ai An
*Assistant Examiner*—Lechi Truong
(74) *Attorney, Agent, or Firm*—Birch, Stewart, Kolasch & Birch, LLP

(57) ABSTRACT

The invention relates to a method of processing information with a system comprising at least two processing devices coupled to a network, in which method a job for processing information is defined by a user of the system, whereafter in respect of processing devices belonging to a predetermined set selected from the at least two processing devices, a check is automatically made whether the same are suitable for performing the job, whereafter each processing device of the set is presented to the user via presentation means, wherein for each of said processing devices an indication is given whether the same is suitable for performing the job, whereafter a processing device belonging to the set is selected, and at least a part of the job is transmitted to the selected processing device. The invention also relates to a system for processing information suitable for applying this method and a computer program element for an information processing system to perform this method.

39 Claims, 7 Drawing Sheets

U.S. PATENT DOCUMENTS

| | | | | |
|---|---|---|---|---|
| 5,727,135 | A * | 3/1998 | Webb et al. | 358/1.14 |
| 5,898,821 | A * | 4/1999 | Brandkamp | 358/3.06 |
| 5,996,029 | A * | 11/1999 | Sugiyama et al. | 710/15 |
| 6,076,110 | A * | 6/2000 | Murphy et al. | 709/228 |
| 6,275,299 | B1 * | 8/2001 | Beck | 358/1.15 |
| 6,282,590 | B1 * | 8/2001 | Ellis et al. | 710/63 |
| 6,469,796 | B1 * | 10/2002 | Leiman et al. | 358/1.15 |
| 7,081,969 | B1 * | 7/2006 | Motamed et al. | 358/1.16 |

OTHER PUBLICATIONS

Takeshita, Display device for printer selecting, Mar. 18, 1993.*
The Hard Copy Observer, vol. V, No. 4, Apr. 1995, "HP Debuts First 600 DPI Desktop Ink Jets, Regains Technical Lead".

* cited by examiner

TECHNOLOGY FOR PROCESSING INFORMATION E.G. REPRESENTING PRINT REQUESTS IN NETWORKED ENVIRONMENT A SYSTEM SUITABLE FOR APPLYING THIS METHOD, AND A COMPUTER PROGRAM ELEMENT COMPRISING A PROGRAM CODE FOR APPLYING THIS METHOD

This nonprovisional application incorporates by reference the subject matter of Application No. 1015415 filed in Netherlands on Jun. 13, 2000, on which a priority claim is based under 35 U.S.C. § 119(a).

FIELD OF THE INVENTION

The invention relates to technology for processing information with a system provided with at least two processing devices coupled to a network, and more particularly to processing information representing print requests.

BACKGROUND OF THE INVENTION

European Patent Application No. EP 0 772 114 is directed toward a method of processing information in a system having at least two processing devices connected to a network. An order for processing informations has two parts, a job and a job ticket. A user of the system, prior to giving an order for processing information by the system, programs a job ticket so that there is selected from the system a combination of processing devices which can carry out the job settings that the user adds to an order. This takes into account the processing capabilities of the various processing devices and if required the actual available attributes thereof. The programmed job ticket can be stored by the user in a memory so that the job ticket can be used at a later stage and more than once. As soon as the user wants to give an actual order for the processing of the information to the system, for example the scanning of a set of originals, the archiving of information, the conversion of texts to word processor data (OCR), the printing of a number of reports etc., the user defines a job and combines it with a job ticket containing the required settings. This combination or order, is then fed to the system for performance.

This method has one important disadvantage. Since the user cannot give the actual order until a job ticket has been programmed, there is the risk that at the time that this order is given the selected processing device or devices are no longer suitable for carrying out the settings associated with the job.

For example, it is possible that a processing device is temporarily unavailable because another user is in the meantime using this device for a very extensive job. Furthermore, a specific processing device may in the meantime have been replaced by another type with fewer capabilities. In the case of printing devices in particular, it frequently happens that the required receiving materials, e.g. paper or film, or auxiliary materials, such as staples, are used up so that orders cannot be executed, or else only partly. In the case of processing devices adapted to transmitting data, such as facsimile devices or e-mail servers, there may be a long queue of data for transmission at the time that the above-mentioned user passes his order to the system. Particularly if there is a considerable interval of time between programming the job ticket and giving the actual order for processing the information, there is a considerable risk that the selected device or devices are not available for performing the order.

The consequence of this is that the user who defines the job and transmits it to the system is assuming that the system really will perform his job, while that probably will not happen (for example because a selected device has broken down), will happen much later (for example because a selected device is temporarily unavailable) or will happen only partly (because a specific processing capability of the device is not available).

SUMMARY OF THE INVENTION

The invention, in part, procides a method wherein, after the job has been defined, it is clear to the user whether a selected processing device is suitable for performing the job. For this purpose, a method according to the invention comprises the following steps: a job for processing information from a user of the system, automatically checking whether processing devices belonging to a predetermined set selected from at least two processing devices are suitable for performing the job, presenting an indication for each processing device of the set to the user (via presentation means) of whether the same is suitable for performing the job, receiving a selection of a processing device belonging to the set, and transmitting at least a part of the job to the selected processing device. Thus with the method according to the invention, a job is first defined completely with all the required settings, and a check is made for a predetermined set of devices automatically, i.e. by the system, as to what processing devices, whether or not in combination, are suitable for performing the job. In this case it is possible to check not only whether the processing devices have the required capabilities, but also whether these capabilities are available at the time the job is defined. Furthermore, the set of processing devices is presented to the user via presentation means, for example via a monitor screen or some other means generating signals which are perceptible to the user either visually, audibly, or in some other way, it being indicated for each of said devices whether the same is suitable for performing this job. On the basis of this indication, a device is selected and the job is passed to the selected device. It is also possible to split the order and transmit a part of the job to a first device and another part to a second device so that the job can be performed more quickly.

An important supplementary advantage of the method according to the invention is that even the processing devices which are not suitable for performing the job at the time the job is defined are presented to the user. By giving the user a complete overview of both the suitable and the unsuitable processing devices, it is possible to obtain an open interaction between the user and the system. If, for example, a device that the user prefers, e.g., because it is situated at a location close to his workplace at the time, appears to be unsuitable, the user can adapt his job, for example by omitting a specific setting, so that the device which he prefers can be made suitable for performing the job. An interaction of this kind is made much easier by presenting all the processing devices belonging to the set, so that the method can give a considerable saving in time for the user.

In one embodiment of the invention, the processing devices are printing devices, for example printers, plotters and other devices which can print receiving media with image-forming materials. Particularly in the case of this type of processing device, the above-mentioned problem is present because many processing capabilities of such devices are dependent on the presence of processing materials such as receiving media, image-forming materials such as toners or inks, other auxiliary materials such as staples, covers, binding edges, glue, and so on. In addition, devices of this kind are relatively frequently subject to malfunctioning, so that a device can suddenly become unavailable for a relatively long period.

In a further embodiment of the invention, the presentation means indicates, in the event of a processing device being unsuitable for performing the order, what the reason for this is. In this way, the user is kept informed as to why a specific processing device is unsuitable. This is an important aid to the user in his dealings with the system. If the user knows why a specific device, for example the device which he normally particularly prefers, is not suitable for performing the job, he can check or determine: whether he wishes to have the job performed in adapted form by this device which in principle is unsuitable (for example by omitting a specific setting); whether the device is simply unavailable for a short time (for example the paper has to be refilled), so that his job will not be immediately performed but will be so in the very near future, if he nevertheless selects this device which in principle is unsuitable; or whether the device is unavailable for a relatively long time (for example the device is no longer in operation). In this way the user thus knows beforehand what disadvantage will occur in performing the job if he nevertheless selects an unsuitable device for performing that job. If this disadvantage is sufficiently minor with respect to the advantage of using that device, for example the favourable location, good processing quality, or low processing costs, it may nevertheless still be favourable for the user to select precisely that device.

Indicating the reason why a processing device is not suitable for performing a job, can also be favourably utilised in an alternative method according to the invention in which the system comprises one processing device. The user then knows why that device is not suitable and he can either adapt his job, for example have it carried out to a limited degree, or search for an alternative processing device belonging to another system.

In another embodiment of the method according to the invention, a reason for the non-suitability of a specific processing device is indicated in response to that processing device being allocated by the user of the system. If, for example, the presentation means comprises a monitor screen coupled to a workstation and which is controllable by a mouse, the user can allocate a device which is indicated on the screen as being unsuitable for performing the job, such allocation being effected, for example, by setting the mouse cursor on the device and then e.g., double clicking on the left-hand mouse button so that a separate window indicates one or more causes of the unsuitability. This method has the advantage that the quantity of information presented to the user via the presentation means remains restricted and information concerning the unsuitability of a device is indicated only if the user so requests.

In another embodiment according to the invention, a part of the job is presented to the user, which part preferably contains one or more settings of the job. This has the advantage that the user can immediately take note of the job that he defines and has an overview of the job defined by him. Preferably, this part of the job is presented to the user via the presentation means simultaneously with the set of processing devices. In the event that the presentation means comprises a monitor screen, then in one embodiment of the method according to the invention the settings of the job are displayed in a first window and a list of processing devices belonging to the set is displayed in a second window next to the first. The user then sees at a glance which devices are suitable or unsuitable for performing the job defined by him. By allocating an unsuitable device, for example, it is then possible immediately to indicate in the first window which of the settings will not be carried out if this unsuitable device is selected for performing the job.

In a subsequent embodiment according to the invention, the presentation means indicates what device has been selected. In the case of a visual presentation, particularly via a monitor screen, the selected device can be marked, for example by shading the background of the code by which this device is represented. In this way it is clear to the user which of the processing devices has been selected at that time for performing the job. In a further embodiment, the job is not transmitted to this selected processing device until after confirmation of that selection. In this way the user always still has the possibility of changing a previous selection if that appears favourable. Preferably, the selection is confirmed by the user himself.

In one embodiment of the method according to the invention, in the first instance, a processing device is selected by the system itself on the basis of one or more predetermined criteria, whereafter the user has the possibility of changing this selection. In this way the user is not compelled to select a device himself for each order but the system makes a default selection. The user still retains complete control of this because on the one hand he can input the criteria on the basis of which the system selects a device (examples of criteria are a processing property of the device, such as quality, cost price and speed, distance between the device and the user or workstation, device availability, personal preference of the user, and so on) and on the other hand he can always change a default selection before he confirms the selection.

In yet another embodiment according to the invention, the presentation means separately indicates whether at least one processing device belonging to the set is suitable for performing the job. This can be shown, for example, via a master symbol on the monitor screen. In this way the user is immediately informed whether his job can at least be performed as defined by him. If, for example, only one device is suitable, the above-mentioned default selection would automatically be able to relate to that device.

A system suitable for performing the method according to the invention comprises coupled to a network: at least two processing devices, defining means for defining an order for processing information, research means for checking whether processing devices belonging to a predetermined set selected from the at least two processing devices are suitable for performing the defined job, presentation means for presenting the processing devices of the set, it being indicated for each processing device whether the same is suitable for performing the defined job, and finally selection means for selecting a processing device.

The invention also relates to a computer program element, i.e. any medium suitable for carrying data, for example a floppy disk, CD ROM, DVD, minidisc, network etc., comprising a computer program code for performing the method according to the invention on an information processing system.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

FIG. 3, which comprises

DETAILED DESCRIPTION OF PREFERRED EMBODIMENTS

FIG. 1

Figure 1:
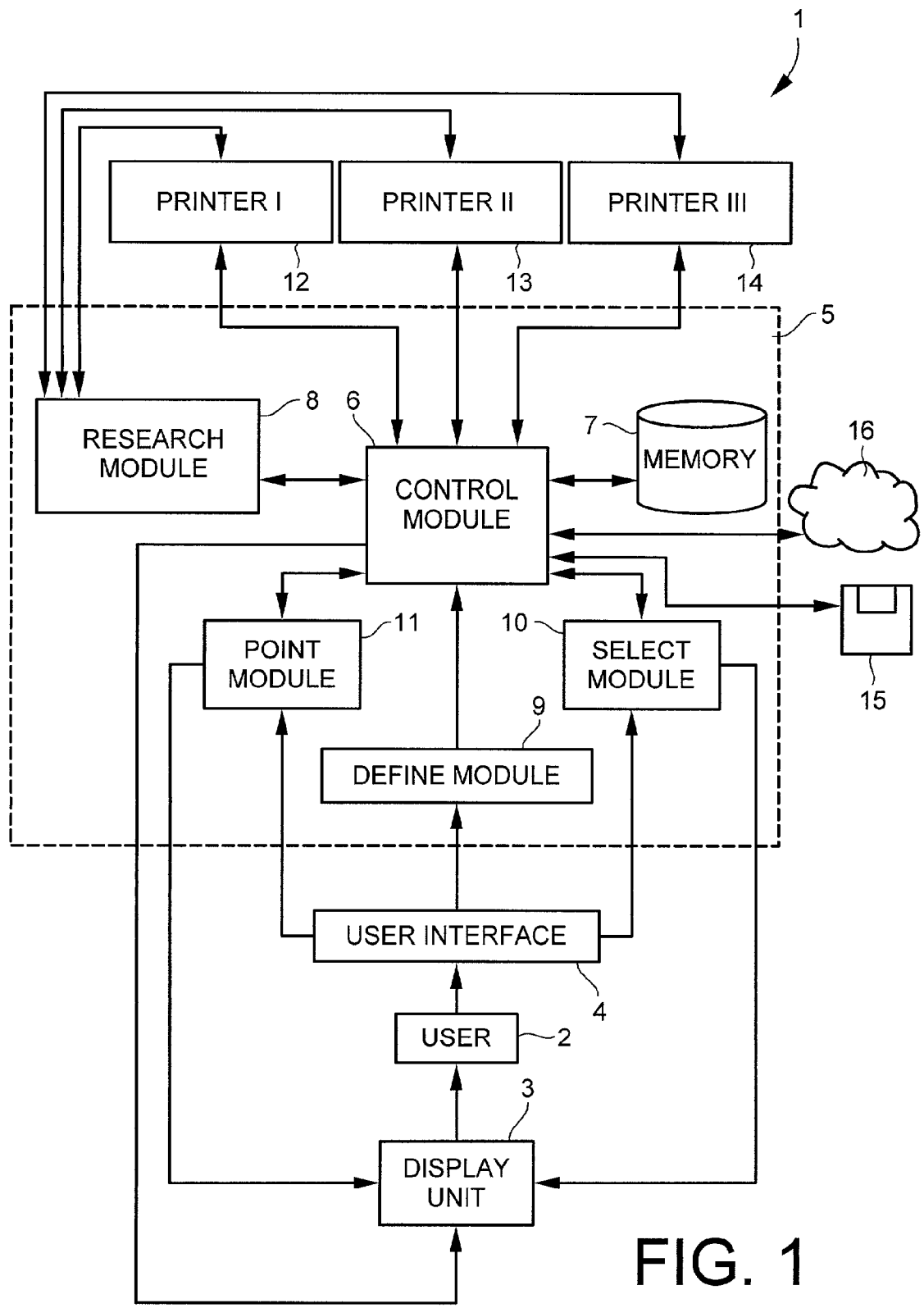
FIG. 1 is a diagram showing an information processing system suitable for applying the method according to the invention.

FIG. 1 is a diagram of an information processing system 1 according to the invention. In this preferred embodiment, the user 2, in this case a person, has interaction with the system via a display unit 3, in this case a monitor screen, and a user interface 4, more particularly a keyboard in combination with a mouse. Monitor screen 3 and the user interface 4 together form a workstation for the user.

This workstation is coupled to a server 5, including a central control module 6 for controlling the information flows within the system, a memory 7 for the storage of data, a research module 8 operable to check whether processing devices belonging to the system are suitable for performing a specific job, a define module 9 operable to define a job for the processing of information, a select module 10 for selecting a processing device, and a point module 11 for allocating a processing device. It is not essential for the system that each of these modules should form part of the server 5. It is also possible that at least some of the modules form part of the workstation or that the modules are distributed over a plurality of servers and/or workstations.

A number of information processing devices 12, 13 and 14 are coupled to the server 5. In this preferred embodiment, these devices are printing devices with different print capabilities.

The method according to the invention can be performed on known server technology. It is only necessary to control this known server in the correct manner, i.e., according to the invention. For this purpose, the server can be provided with the correct computer program code ("software"), which enables the system to perform the method according to the invention. This software can be installed on the server via a computer program element, in this case a floppy disk 15 or a set of data on a network loaded into the server via a network connection 16.

An advantage of the method, software and system according to the invention is that a user can make use of the capabilities of different printing devices without having to deal with complex installation or configuration programs for each separate device. As soon as an arbitrary workstation has been coupled to the system, each printing device belonging to that system is accessible to a user of that workstation because the installation of each printing device takes place at the level of the server 5.

If a user 2 wishes to print a data file he defines from the workstation an order for the printing of this information. In addition to the actual data file, this order comprises one or more settings for the printing of the file, more particularly the paper format, the paper orientation, colour or gary scale appearance, simplex or duplex printing, stapling, and so on. The system 1 offers the user a number of basic settings via the monitor screen 3, and these basic settings can be changed by the user via the user interface 4.

The define module 9 collects the information that the user inputs relating to the job. Via the control module 6, all the components which together form the job as such are stored in the memory 7. The control module 6 is operable to cause the order, or at least the associated settings, to be displayed to the user via a window on the monitor screen 3.

The control module 6 then actuates research module 8. The control module 6 communicates to the research module 8 what order has been stored in the memory, particularly the associated settings. The research module 8 then checks which of the printing devices 12, 13 and 14 is suitable for performing the order. In this preferred embodiment, the research module 8 checks not only whether the printing devices 12, 13 and 14 have the printing capabilities appropriate to the job, but also whether these capabilities are available. The result of this research is stored by the control module 6 in the memory 7 and is directly presented to the user via the monitor screen 3. A second window can be shown on this screen with a list of the printing devices, or at least codes for the same. Beside each printing device there is an indication of whether the same is or is not suitable for performing the job at that moment, for example by providing the code with a red mark if the intended printing device is not suitable, and a green mark if it is suitable.

In this embodiment, there is an automatic indication whether each printing device is on standby, i.e. available for performing print jobs generally. If that is not the case, for example because there is a paper jam, or because the printing device has broken down, the reason for this is indicated.

In this preferred embodiment, the user is in addition offered the possibility of allocating a printing device from the list of printing devices as presented to the user via the said window on the screen, such allocation being effected by actuating the point device of the workstation. In this embodiment, this takes place by placing the mouse cursor on the screen on to one of the printing devices and then e.g., double clicking on the left-hand mouse button. The consequence of this allocation is that the user directly obtains information via the monitor screen 3 as to the capabilities of the allocated printing device in relation to the defined job, more particularly the settings which form part of this job.

If the user, for example, indicates a printing device which is not suitable for performing the job, because the associated printing device cannot accept one or more of the settings, control module 6 indicates, in the window in which the job settings are displayed, what the settings are that the associated printing device cannot accept, for example by marking them with a red icon.

An advantage of this is that the user is directly informed why the associated printing device is not suitable for performing the job. Let us assume, for example, that the printing device which has his personal preference, e.g., because it is very close to his workstation, is unsuitable because of a reason which to him is only of secondary importance, for example an inability to staple because the staples have been used up. He will then still be able to select this printing device, quite willingly accepting the fact that his print job will not be stapled. This gives him the advantage that he does not have to go and fetch his print job from a more remote location. It is also possible for the user, aware of this information, to change his job by altering the "stapling: yes" setting to "stapling: no". The system will respond to this by changing the red mark to green at the associated printing device.

In this preferred embodiment, the system comprises a selection module 10 with which a printing device can be selected. This selection module 10 selects a default printing device as soon as the job has been defined by the user. This default selection takes place on the basis of one or more selection criteria stored in the memory 7. These criteria are placed in the memory 7 beforehand on installation of the server 5 and can subsequently be adapted or renewed by the system user or manager. The selection criteria may be static criteria, such as a processing property of the printing device (default selection, for example, is the printing device which prints with the highest resolution), the distance between the user and the printing device (the default selection is the printing device closest to the workstation), the printing costs (the default selection, for example, is the printing device which has the lowest cost per print) and the personal preference of the user.

In addition it is possible for the selection module to use dynamic criteria, taking into account the result of the research carried out by in the research module 8. Examples of this are the device which is projected to perform the job most quickly as a default selection (for which a complex calculation will be required based on printing speed, availability and other data), the device available at that moment in order to perform the job in combination with the distance from the user, and so on.

The selection module 10 also is operable to change the selection. In this embodiment, the user can indicate via the user interface 4 how he wishes to change his selection, for example by selecting a device via the mouse.

In this embodiment, the sequence in which the printing devices are presented to the user is determined beforehand, for example by the system manager or on the basis of the static selection criteria, but it is possible to subordinate this sequence either alone or jointly to dynamic criteria, so that for example a device which is suitable and is at the same time the least distance from the user is the first presented to the user.

In this embodiment, the selection module 10 also is operable to confirm a specific selection. If the user confirms a selection for a printing device via the workstation, the control module 6 calls the job up from the memory 7 in response thereto and transmits it to the selected printing device. If the user 2 has not changed the default selection, then the order is transmitted to this default printing device by confirmation. It is possible that this printing device cannot accept specific settings or that it is temporarily unavailable. This means that the job can only be performed partly, in this case at a later time. However, before he confirms a selection, the user can change the default selection via the workstation to a selection of his preference. In this way the user can at all times keep control over the system and himself determine the printing device on which he wants his job done.

FIG. 2

Figure 2:
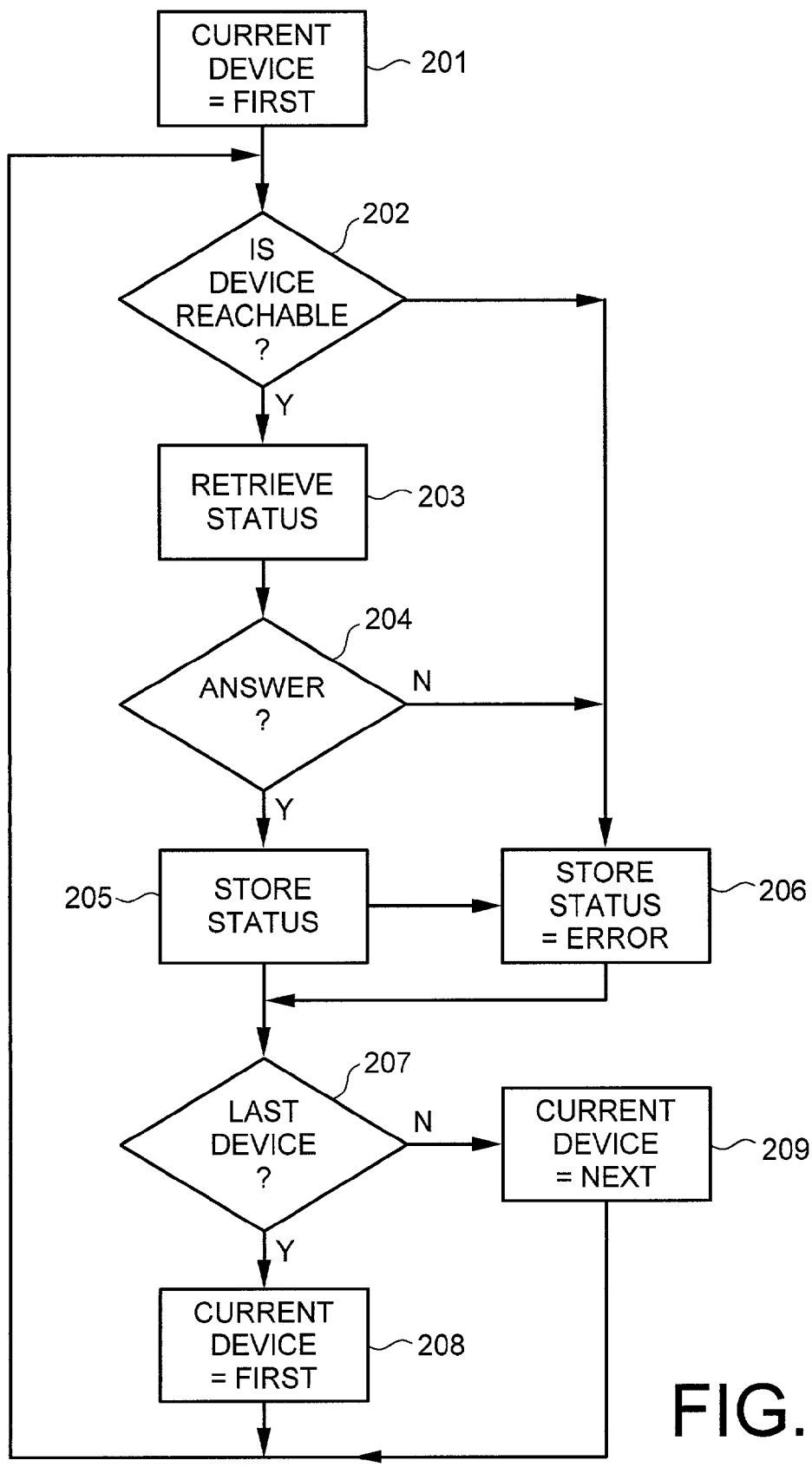
FIG. 2 is a flow chart again suitable for a research module belonging to the system according to the invention.

FIG. 2 is a flow chart suitable for the research module 8 belonging to the system. In this embodiment, the research module 8 continuously checks whether each of the printing devices is suitable for performing a job. If the user has not yet defined any concrete job, a check is made whether each of the printing devices can perform a standard job stored in the memory. This standard job comprises a text file for printing and the basic settings referred to in the description of FIG. 1. As soon as the user introduces a job via the define module 9, a check is made whether the printing devices 12, 13 and 14 are suitable for performing the input job so that the user is immediately informed of the capabilities that the system offers him for performing his job.

To carry out the check, the first printing device of the set of printing devices for checking is converted in step 201 to the current printing device, i.e. the device for checking in this partial check. In step 202 a check is then made whether this printing device comes within reach of the system. If not, for example because this printing device is not coupled to the network, the value "error" is assigned to the status. This status is stored in memory 7 via the control module 6. If the printing device is within the system reach, then the status of the device is first retrieved in step 203. In this embodiment, this status comprises all the information relating to the capabilities of the device and its availability with respect to the job. If no answer comes in step 204, then the printing device cannot be actuated and the research module assigns the value "error" to the status in step 206. If an answer does arrive, this is stored as status in the memory 7 via the control module 6. In step 207 a check is then made whether the printing device checked is the last printing device of the set being checked. If not, then in step 209 the next printing device becomes the current printing device to be checked. If so, the first printing device becomes the printing device for checking. The research then continues with step 202.

In this way the printing devices are continuously checked as to their suitability. After all the devices have been checked for suitability, it is possible to start a new check only if a change occurs in the job (for example a change of a setting) or in one of the printing devices themselves (e.g. the paper, toner, ink, staples or some other consumable has been used up, there is a paper jam, the printing device is switched off, and so on). Since in this way the server 5 is required to start a subsequent check only when a specific event occurs, it is subjected to much less loading and the consequence of a change affecting the performance of a job defined by the user can be presented by the system to said user more quickly.

FIG. 3

Figure 3A:
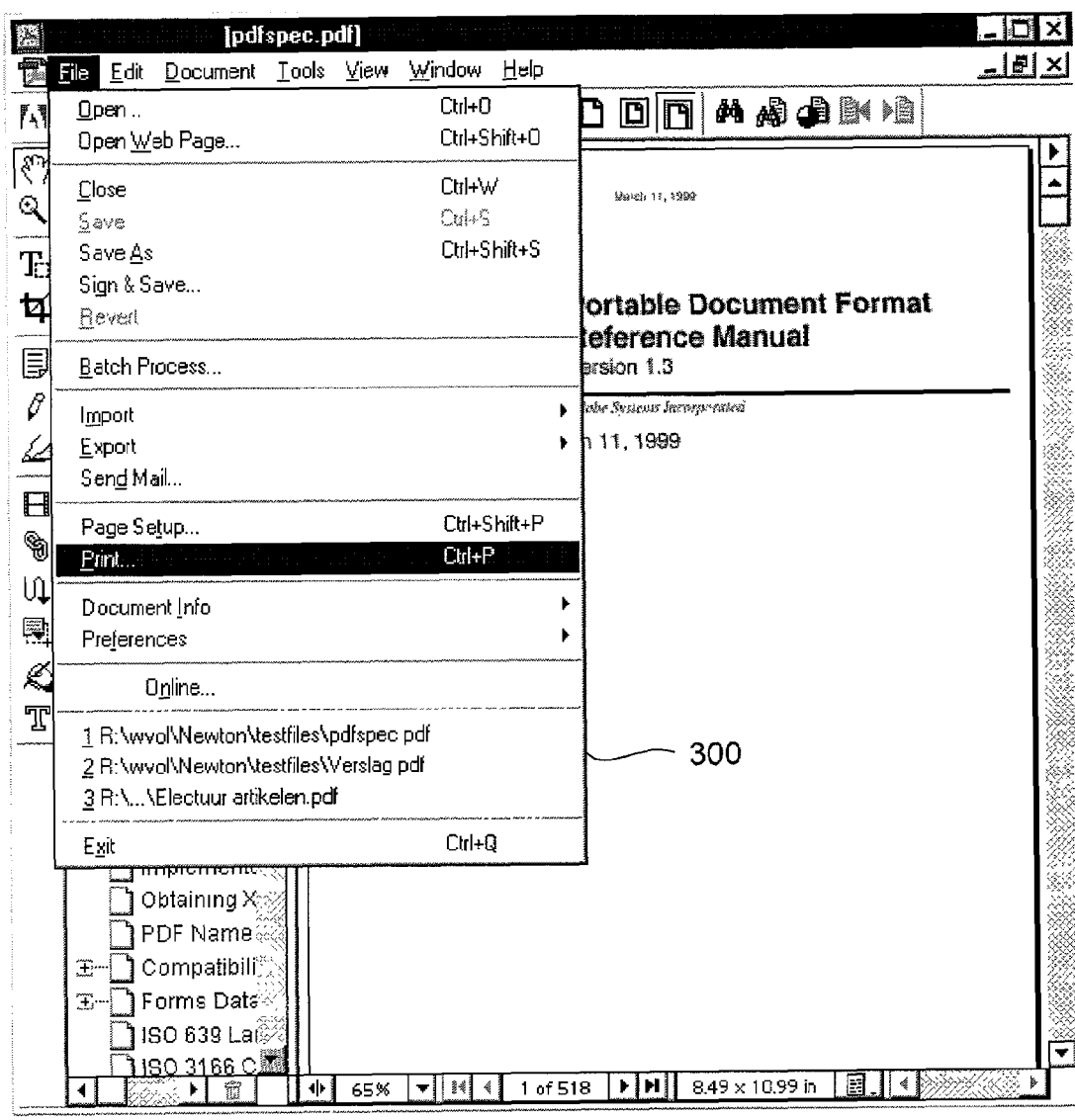
FIGS. 3A, 3B, 3C, 3D and 3E, shows how the method is presented to the system user according to the invention.
Figure 3B:
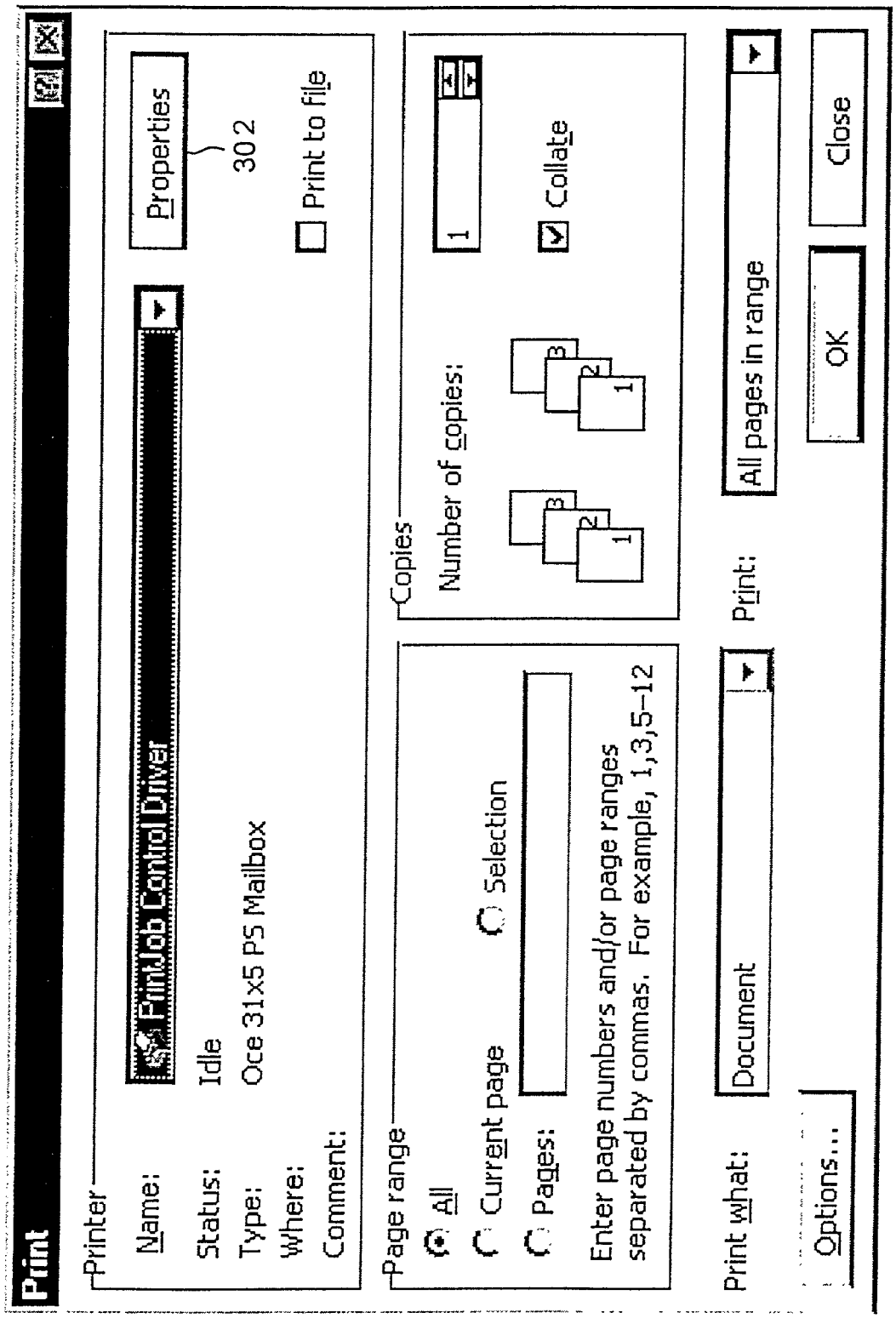
Figure 3C:
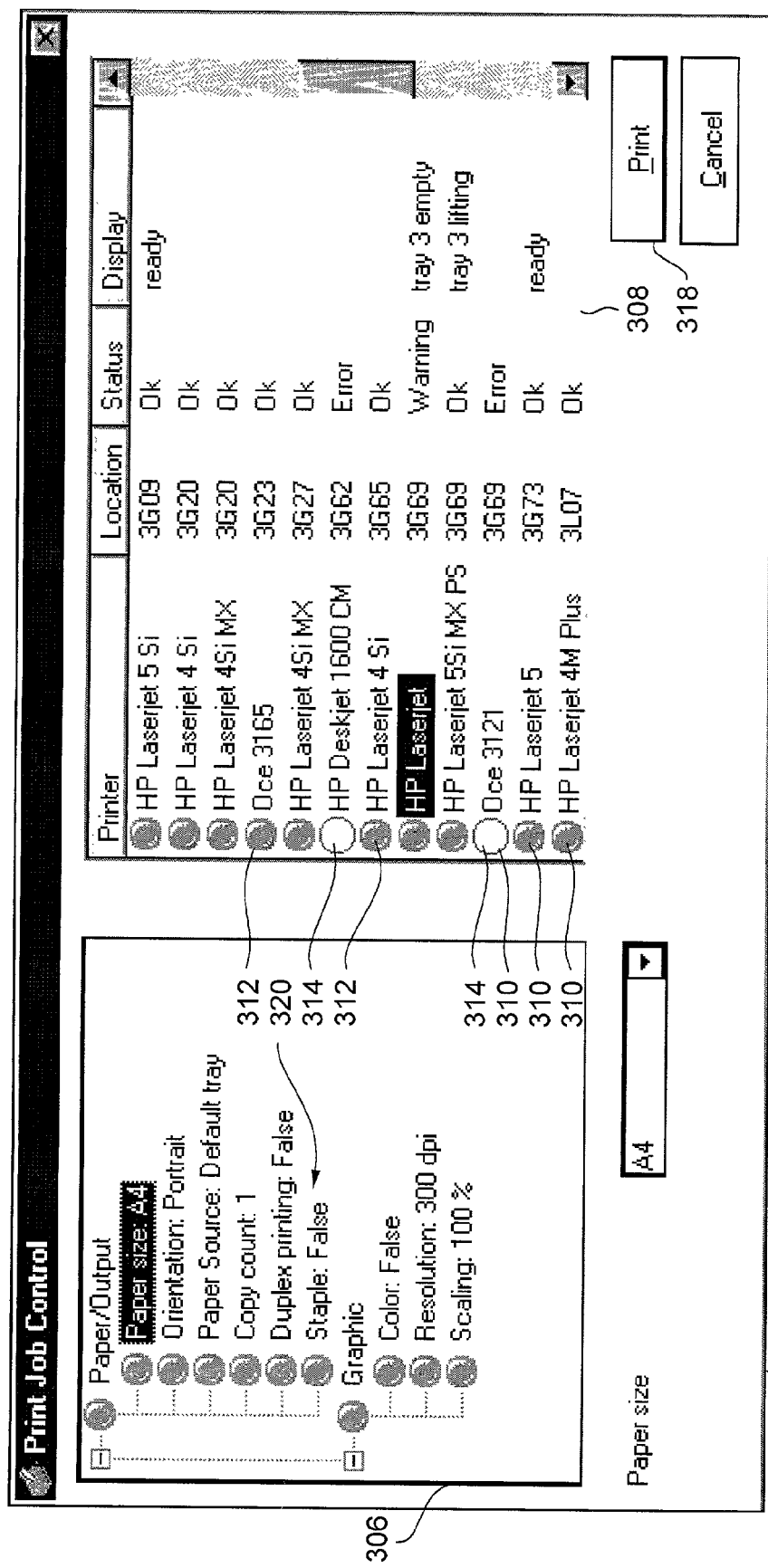

FIG. 3 again is formed of FIGS. 3A, 3B, 3C, 3D and 3E. And it shows how the method is presented to the system user. As soon as the user, for example of a word processor such as Microsoft Word, decides to have a file printed, he selects the option "File/Print" in the menu of this word processor as offered via the monitor screen 3. This is illustrated in FIG. 3A by the dark or highlighted bar in the selection menu 300. As soon as this option has been selected, the print dialogue window appears on the screen as shown in FIG. 3B. In FIG. 3B, elementary settings such as the required number of copies (in the "Copies" sub-window) and the pages for printing (in the "Page Range" sub-window) can be set in this window. If the user now selects "OK" the order transmitted to the default printing device is the file for printing with standard settings (e.g.: A4 format, portrait orientation, standard paper, simplex, no staple, black and white, 300 dpi resolution, 100% scale). In that case, however, the user does not know whether the job can be performed immediately, what settings cannot be accepted, and so on. By selecting the "Properties" button 302 in the "Printer" sub-window, the dialog window 304 appears as shown in FIG. 3C.

In FIG. 3C, the left-hand box 306 displays the settings of the job, in this case the default settings: A4 format, portrait orientation, standard paper, one copy, simplex, no staple, black and white, 300 dpi resolution, scale 100%. The right-hand box 308 displays the list with printing devices belonging to the system ("HP Laserjet 5 Si to HP Laserjet 4M Plus), their location (3G09 to 3L07) and their current status. The term "OK" denotes that the relevant printing device is available, "error" indicates that the printing device is not available. Also, in the case of the dark or highlighted "HP Laserjet" printing device, a warning is given that paper tray 3 is empty. Finally, under "Display" column, extra information of importance to the user can be given for each printing device. One of the printing devices, namely "HP Laserjet" is marked by the colours of the background (dark or highlighted) around the code because this is the default printing device.

In FIG. 3C, a coloured round icon 310 indicates for each printing device whether the same is suitable for performing the job. In this embodiment, three colours are used: a green icon (half-closed icon) 312 means that the relevant printing device can perform the job as defined at that time, a yellow icon (open icon) 314 means that the printing device does have the correct properties for performing the job but at the moment they are not (all) available, while finally a red icon (closed icon) 316 (not shown in FIG. 3C but see FIG. 3D) means that the relevant printing device does not have the correct properties for performing the job as defined. If the user selects the "Print" button 318 then that confirms the selection made by the system. In response to this, the system transmits the job to the default printing device "HP Laserjet", which according to the associated green icon is suitable for performing the job as defined.

Figure 3D:
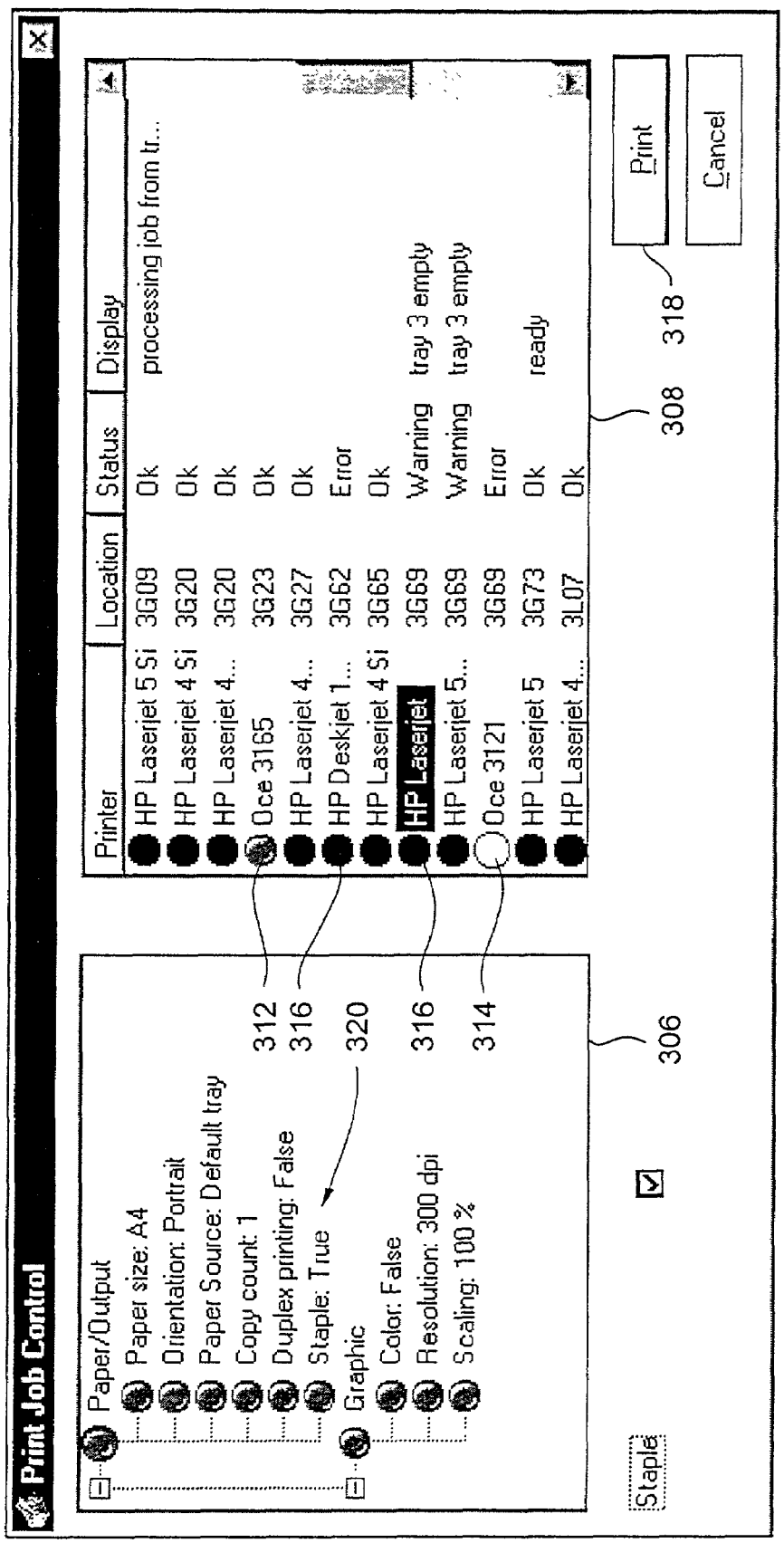

If, however, the user wants a staple to connect the printed receiving materials, he can change the standard setting 320 from "Staple: False" to "Staple: True" before confirming the selection. This is shown in FIG. 3D. As a result of this change, the research module 8 will re-check whether the printing devices are suitable for performing the job. It now appears that only the printing device Océ 3165 has a green icon 312. If the user were now to select the "Print" option, the job would nevertheless be given to the default printer HP Laserjet, but this will perform the job without providing the receiving materials with a staple. The user, however, can also alter the selection by selecting the printing device Océ 3165, for example via the mouse, and then confirming this new selection by selecting the "Print" button 318. As a result the job is performed as defined.

By indicating in the right-hand window 308, for example via the mouse, a printing device which is not suitable for performing the job, the left-hand window 306 will indicate why this printing device is not suitable. This is shown in FIG. 3E.

Figure 3E:
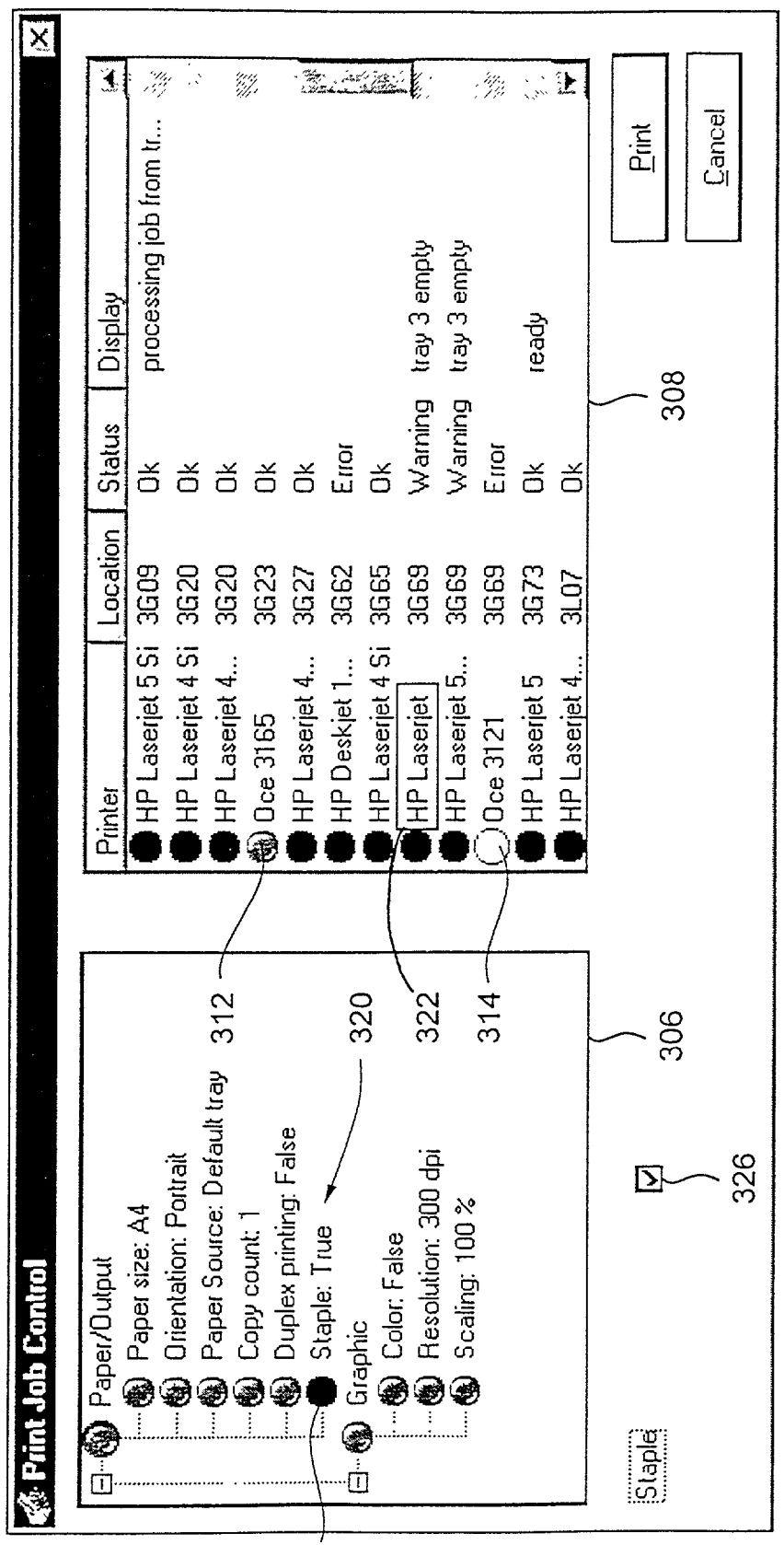

In FIG. 3E, the user has allocated the default printing device HP Laserjet, which is shown in the window by the open frame 322 around this printing device. As a result, the round icon 324 in front of the "Staple" option 320 turns red. It is now clear to the user why this printing device is not suitable. He can then decide whether he nevertheless wants the order carried out by the default printing device, with the omission of a staple, or he can choose a printing device which is suitable.

Under the left-hand window 306 to the right of the centre a tick or checked box 326 is indicated to show the user that at least one device is suitable for performing the job. This is an advantage when there is a long list of devices which cannot all fit in the right-hand window 308.

In an alternative embodiment of the method according to the invention, use is made of soft settings. This means that a user in addition to the option "Setting x: no" and "Setting x: yes" has the opportunity of a less hard choice, for example "Jobsetting x: Don't care". This can if required be extended to settings such as "Jobsetting x: On_Nice" or "Jobsetting x: Off_Nice". By making use of such settings, a device which for example cannot carry out duplex printing is not considered unsuitable if the user has selected the setting "Duplex: Don't care" or "Duplex: On_Nice". Via the display unit 3 means the user can be kept informed of such "less" suitability, for example by giving the green icon a red frame (not depicted). In the selection of a default device it would also be possible to allow for this outcome.

It should be clear that it is possible not only to show that a specific setting cannot be carried out by an allocated printing device, but that also other causes of "non-suitability" can be presented to the user in one way or another. The causes of this and how they are presented to the user do not form part of the present invention. The invention can also be expanded in obvious manner to the man skilled in the art, by supplementary means such as "Queue monitoring", "Job-feedback", "Time-till-completion" and "Re-routing", which are adequately known from the prior art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of processing information with a system provided with a plurality of processing devices coupled to a network, the method comprising:
   receiving a definition of a job for processing information from a user of the system;
   automatically checking whether all processing devices belonging to a predetermined set selected from the plurality of processing devices are suitable for performing the job;
   presenting an indication for each processing device of the set, to the user via presentation means, of whether the same is suitable for performing the job;
   if a processing device among the processing devices belonging to the set is not suitable for performing the job, then a reason for this is indicated via the presentation means;
   after that, selecting a processing device out of all processing devices belonging to the set, wherein the processing device not suitable for the job is selectable to become the selected processing device; and
   transmitting at least a part of the job to the selected processing device, wherein the step of selecting includes selecting the processing device on the basis of a predetermined criterion selected from the group comprising processing properties of the processing device, a distance between a user and the processing device, availability of the processing device, printing costs and a personal preference of the user.

2. The method according to claim 1, wherein the plurality of processing devices are printing devices.

3. The method according to claim 1, wherein the indication of the reason that the processing device is not suitable for performing the job is made in response to said processing device having been selected by the user.

4. The method according to claim 1, wherein a part of the defined job is presented to the user.

5. The method according to claim 4, wherein said part of the job comprises a setting of the job.

6. The method according to claim 4, wherein said part of the job is presented to the user simultaneously with said indication the processing devices of the set via the presentation means.

7. The method according to claim 1, wherein the selected processing device is indicated on the presentation means.

8. The method according to claim 7, wherein after a confirmation of the selection of the processing device, the job is passed to the selected processing device.

9. The method according to claim 8, wherein the confirmation of the selection is received from the user of the system.

10. The method according to claim 1, wherein a prediction as to what will be the selected processing device is predicted by the system on the basis of a predetermined criterion, after which the a change from the predicted selection can be received from the user.

11. The method according to claim 10, wherein the criterion is availability of the processing device.

12. The method according to claim 10, wherein the criterion is processing cost.

13. The method according to claim 10, wherein the criterion is a previously indicated personal preference of the user.

14. The method according to claim 10, wherein the criterion is a processing property of the processing device.

15. The method according to claim 10, wherein the criterion is a distance between the user and the processing device.

16. The method according to claim 1, further comprising indicating via the presentation means separately whether at least one processing device belonging to the set is suitable for performing the job.

17. A method of processing information with a system comprising one processing device and presentation means, the method comprising:
   receiving a definition of a job for processing information from a user of the system;
   automatically checking whether the processing device is suitable for performing the job;
   indicating, if the processing device is not suitable for performing the job, a reason why the processing device is not suitable for performing the job via the presentation means; and
   after that, selecting the processing device, wherein the processing device not suitable for the job is selectable to become the selected processing device for performing the job, wherein
   the step of selecting includes selecting the processing device on the basis of a predetermined criterion selected from the group comprising processing properties of the processing device, a distance between a user and the processing device, availability of the processing device, printing costs and a personal preference of the user.

18. The method according to claim 17, wherein the reason is indicated if the processing device is allocated by a user of the system.

19. The method according to claim 17, wherein the processing device is a printing device.

20. The method according to claim 17, wherein the processing device not suitable for performing the defined job becomes selectable by the user to perform the defined job, after the indicating step.

21. A system for processing information, the system comprising:
   a network to which are coupled the following;
   a plurality of processing devices;
   defining means for defining a job for processing information;
   research means for checking whether all processing devices belonging to a predetermined set selected from the plurality of processing devices are suitable for performing the defined job;
   presentation means for presenting an indication, for each processing device of the set, of whether the same is suitable for performing the defined job, and if a processing device among the processing devices belonging to the set is not suitable for performing the job, indicating why said processing device is not suitable; and
   selection means for selecting a processing device out of all processing devices belonging to the set based on the indication, wherein the processing device not suitable for the job is selectable to become the selected processing device, wherein the selection means are adapted to select the processing device on the basis of a predetermined criterion selected from the group comprising processing properties of the processing device, a distance between a user and the processing device, availability of the processing device, printing costs and a personal preference of the user.

22. The system according to claim 21, further comprising first indicating means to indicate, in the event that the research means has determined that a displayed processing device is not suitable for performing the job, why said processing device is not suitable for performing the job.

23. The system according to claim 22, further comprising allocating means for allocating a processing device, said allocating means being connected to the display means in such manner that in response to the allocation of the processing device the indicating means indicate why this processing device is not suitable.

24. The system according to claim 23, wherein the allocation means are controllable by a user of the system.

25. The system according to claim 21, further comprising means for displaying a part of the job.

26. The system according to claim 25, wherein said part comprises a setting of the job.

27. The system according to claim 25, wherein the means for displaying a part of the job is connected to the presentation means for presenting the said part to the user via the said presentation means.

28. The system according to claim 25, wherein the presentation means is adapted to present said part of the job and the set of processing devices simultaneously.

29. The system according to claim 21, further comprising means with which a user of the system can change the selection.

30. The system according to claim 21, further comprising confirmation means connected to transmission means so that after confirmation of the selection of the processing device the job is transmitted to said selected processing device.

31. The system according to claim 21, further comprising second indicating means to indicate whether at least one processing device belonging to the set is suitable for performing the job.

32. The system according to claim 21, wherein the processing device not suitable for performing the defined job becomes selectable by a user to perform the defined job, after the presentation means indicates why said processing device is not suitable for performing the defined job.

33. The system according to claim 21, wherein at least one of the plurality of processing devices is an inkjet printer.

34. A system for processing information, the system comprising:
   a processing device;
   defining means for defining a job for processing information;
   research means for checking whether the processing device is suitable for performing the defined job; and
   indicating means to indicate a reason, in the event that the research means shows that the processing device is not suitable for performing the job, why said processing device is not suitable for performing the job, wherein the processing device not suitable for the job is selectable to become a selected processing device for performing the job, wherein the research means are adapted to check the processing device on the basis of a predetermined criterion selected from the group comprising processing properties of the processing device, a distance between a user and the processing device, availability of the processing device, printing costs and a personal preference of the user.

35. The system according to claim 34, further comprising allocation means for allocating the processing device in such manner that the indicating means indicates why the processing device is not suitable if the same has been allocated by the allocation means.

36. The system according to claim 34, wherein the processing device is a printing device.

37. The system according to claim 34, wherein the processing device not suitable for the defined job becomes selectable by a user to perform the defined job, after the indicating means indicates why said processing device is not suitable for performing the defined job.

38. A tangible computer program element storing computer program code for causing a processor to perform the method according to claim 1.

39. A tangible computer program element storing computer program code for causing a processor to perform the method according to claim 17.

* * * * *